United States Patent
Bachl

[11] 4,293,278
[45] Oct. 6, 1981

[54] FLUID-FLOW MACHINE

[75] Inventor: Herbert Bachl, Munich, Fed. Rep. of Germany

[73] Assignee: Getewent Gesellschaft fur technische und Wissenschaftlichs Energieumsatzentwicklungen m.b.H., Kaufbeuren-Neugablonz, Fed. Rep. of Germany

[21] Appl. No.: 13,537

[22] Filed: Feb. 21, 1979

[30] Foreign Application Priority Data

May 16, 1978 [DE] Fed. Rep. of Germany ....... 2821233
Jan. 26, 1979 [EP] European Patent Office ............... 79.100227.2

[51] Int. Cl.³ ............................................. F01D 5/14
[52] U.S. Cl. .............................. 416/186 R; 415/120; 416/188
[58] Field of Search ................ 416/179, 186 R, 188; 415/83, 120

[56] References Cited

U.S. PATENT DOCUMENTS 3,063,673 11/1962 Johnson ............................... 416/179
4,029,431 6/1977 Bachl ..................................... 415/69

*Primary Examiner*—Leonard E. Smith
*Attorney, Agent, or Firm*—Blanchard, Flynn, Thiel, Boutell & Tanis

[57] ABSTRACT

Disclosed is a fluid-flow machine comprising at least one disc-shaped rotor provided with flow channels for a flow medium. The intake openings of the flow channels are disposed on one side of the rotor, while the respective exit openings are located at the other axial surface, the distance of all said intake openings from the axis of rotation being different from that of said exit openings.

Each flow channel has a radially outer and a radially inner elbow, each elbow having two legs forming an angle of about 90° with one another. One leg of one said elbow leads to the intake opening and extends in the direction of the relative velocity of the intake flow prevailing thereat, one leg of the other elbow leading to the exit opening and extending in the direction of the relative velocity of the exit flow prevailing thereat. The respective other legs of the two deflector elbows are aligned with a substantially radial connecting section connecting said deflector elbows with one another.

In this fluid-flow machine, a decrease of the pressure drop per stage is to be achieved without a reduction of circumferential and absolute velocities. Further a small volume flow is to be combined with a relative low pressure drop per stage, and the high speed capacity of the machine is to be augmented.

To this effect, the leg of the one deflector elbow leading to said intake opening and the leg of the other deflector elbow leading to said exit opening are directed such that the tangential components of the relative velocities at the intake and exit openings are unidirectional or that said tangential components are completely absent at the intake openings or at the exit openings.

8 Claims, 13 Drawing Figures

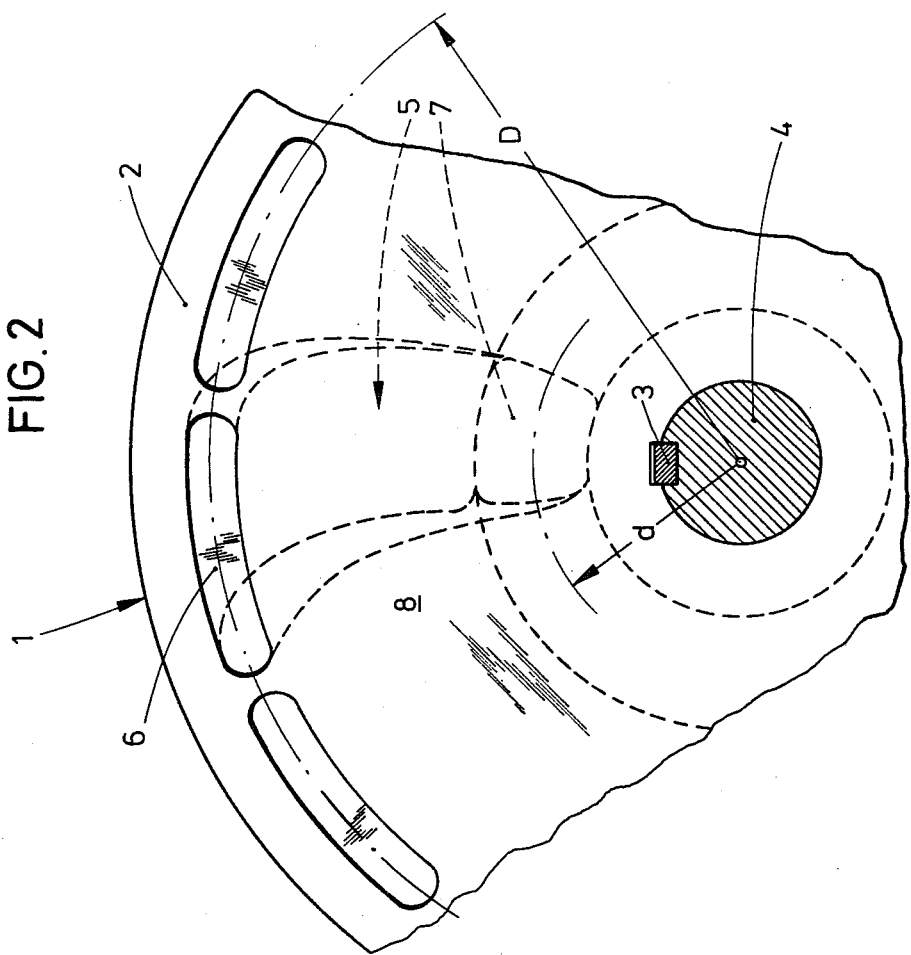
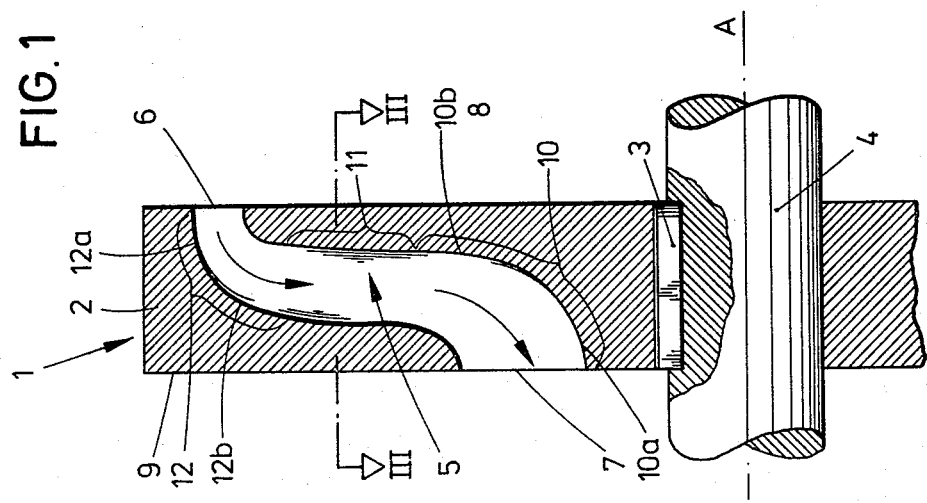

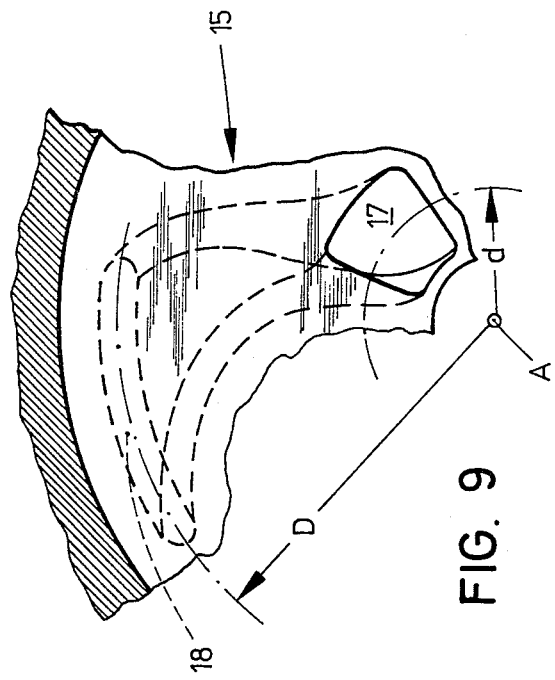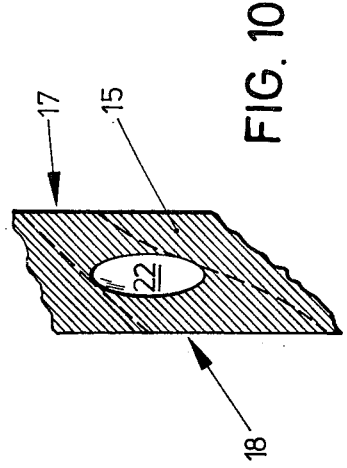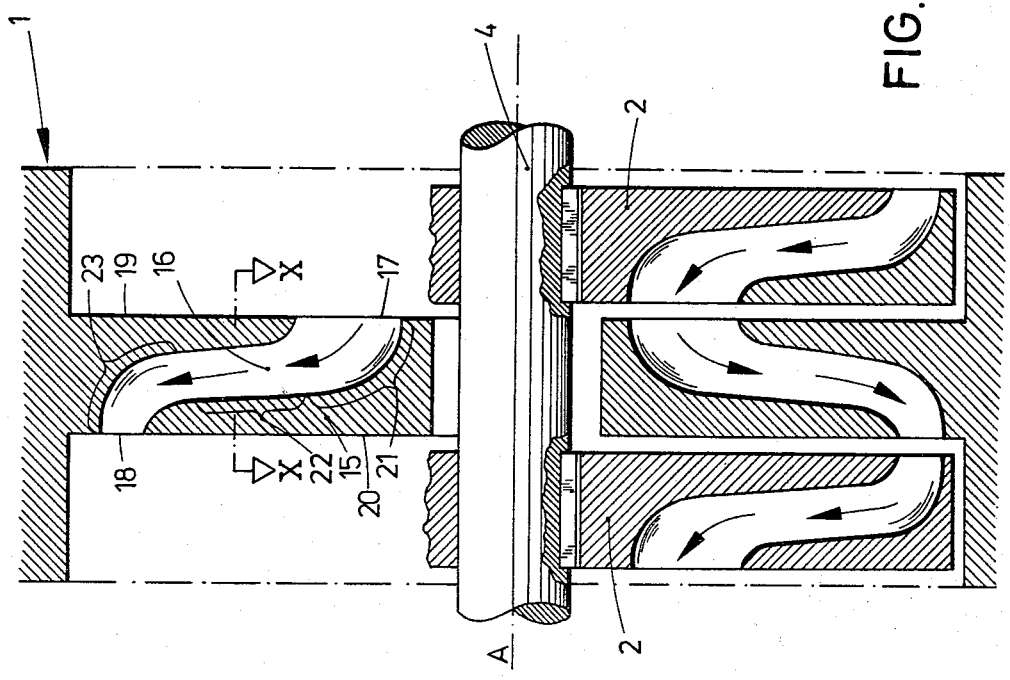

FLUID-FLOW MACHINE

FIELD OF THE INVENTION

This invention relates to a fluid-flow machine having at least one substantially disk-shaped rotor including flow channels for a flow medium the intake openings of which are disposed in one axial surface of the rotor, while the associated exit openings are disposed in the other axial surface, all intake openings being located at a predetermined distance from the axis of rotation, said distance being different from the distance of the respective exit openings from said axis of rotation, each flow channel having a radially outer and a radially inner deflector elbow, each said elbow having two legs forming an angle of approximately 90°, one leg of the radially outer, or inner, respectively, elbow leading towards the intake opening and extending in the direction of the relative velocity of the intake flow of the flow medium prevailing thereat, and one leg of the radially inner, or outer, respectively, elbow leading towards said exit opening and extending in the direction of the relative velocity of the exit flow, the other legs of said elbows being directed towards a substantially radial common connecting section connecting the two elbows with one another.

BACKGROUND OF THE INVENTION

The above description applies to centripetal flow through the flow channels within the rotor, as long as the exit openings are located radially closer to the axis of rotation than the intake openings. In the case of power generating and powered working machines it is also possible, however, to provide centrifugal flow of the working medium within the rotor. In this case the intake openings are located radially closer to the axis of rotation than the exit openings. This embodiment is also included by the invention.

Known from U.S. Pat. No. 4,029,431 (DE-OS No. 24 40 475) is a fluid-flow machine of the type referred to in the introduction, wherein the elbows of the flow channels are directed such that the axial components of the relative velocity at the intake and exit openings extend in the same direction, while the tangential components are directed opposite to one another. This known fluid-flow machine is particularly adapted for use as a power generating or powered working machine designed for small high-speed values, i.e for small flow-through volumes in relation to the pressure drop per stage. That is because high tangential deflection of the flow within the rotor result in low relative velocities permitting low-loss flow-through also of smaller flow volumes as well as relatively high pressure drop per stage with sufficiently high circumferential speeds and absolute speeds at the inlet, or outlet, respectively.

A further advantageous employ of this construction lies in the field of the compression, or expansion, respectivels of gaseous mixtures with or without liquid components in technological processes requiring flow components to be introduced or withdrawn in the course of phase transformation. This is because such admixture processes, or separation processes, respectively, are greatly promoted by the secondary flows developing in the curved sections of the flow channels due to centrifugal forces. In these technological processes it is sometimes desirable to reduce not only the volume flow, but also the pressure drop per stage, in order to achieve optimum graduation of the phase transformation. Such reduction of the pressure drop per stage may of course be obtained by a reduction of the circumferential and absolute speeds at the inlet, or outlet, respectively, such reduction requiring, however, a machine of greater dimensions for a given performance, and thus, an increase in space requirements and material expenditure, and a lengthening of the flow paths within the rotor.

It is thus an object of the invention to achieve such reduction of the pressure drop per stage without reducing the circumferential and absolute speeds for combining a low volume flow with a relatively low pressure drop per stage and to increase the rotational speed capability of the machine in this manner.

In order to attain this object the invention provides that the leg of the radially outer deflector elbow leading towards the intake opening and the leg of the radially inner deflector elbow leading towards the exit opening are directed such that the tangential components of the relative velocity at the intake and exit openings are unidirectional or that these tangential components are completely absent at the intake openings or at the exit openings.

In accordance with the invention, it is not only a case of causing a working medium to flow through the fluid-flow machine, irrespective of whether it is employed as a powered working machine or a power generating machine, the invention also permitting to influence the physical and/or chemical properties of the working medium.

The effect of such influence may be enhanced according to the invention by adding and withdrawing flow components not outside of the machine, but rather in the elbows of the flow channels themselves. To this effect, an opening may be provided in a per se known manner (cf. periodical "Energie," Vol. 28 No. 6/7, 1976, p. 171 et seq.) at the outer periphery of the radially outer or inner elbow of each flow channel of any one rotor or guide wheel stage, respectively, such openings serving for separating flow components from the main flow or adding such flow components thereto via auxiliary channels in the rotor, or guide wheel, respectively.

In many technological processes conducted at high temperatures and pressures, e.g. in the addition of hydrogen to various reactants, one obtains mixtures of initially gaseous components from which the reaction products are separated after lowering of pressure and temperature. Examples for such processes are the ammonia synthesis, methanol synthesis and the hydration of carbon or oil fractions having a high boiling point for obtaining gasoline and other hydrocarbons required as intermediate products by the chemical industry. In these processes, the remaining residual gas, for instance hydrogen, which has to be present in excess for the reaction, usually has to be reheated, compressed and returned to the reaction vessel. These processes therefore require a high expenditure of mechanical (electric) energy for compression and recirculation of the gaseous components.

This energy expenditure can be reversed into an output of mechanical (electric) energy by combining the technological process with a thermodynamic process, wherein the gas leaving the reactor under high pressure and temperature is expanded in a power generating machine. Power generating machines of conventional construction are unsuitable for this purpose, however, since they attain acceptable degrees of efficiency only at very high volume flows and the flow paths in the rotor are not constructed for radial-axial deflection permitting concentration and selective separation of concensing mixture components. In contrast thereto, a fluid-flow machine of the type described herein is able to combine the functions of a mechanical separation apparatus (centrifuge) and of a power generating machine in a single operation by operating as a centrifugal gas turbine. Primary separation of the flow components may occur for instance at the outer elbows of the flow channels in a centrifugal-flow rotor, with secondary separation taking place in the adjacent guide wheel, or it may occur in a guide wheel with radially outwardly directed flow, with the secondary separation then taking place in the adjacent centripetal-flow rotor disc.

If the reaction products are composed of fractions having different boiling ranges, the separation of these fractions from one another usually requires an expensive distillation plant. The invention permits to do at least partially without this plant and to conduct a mechanical fractioned distillation already within a centrifugal gas turbine if the major portion of the product centrifuged at one stage is fed to an exteriorly heated evaporator by means of a pump, and the resulting steam is returned to the main gas flow at a higher pressure and temperature region. This recirculation increases not only the concentration of the products, but also the output of mechanical energy.

An introduction of flow components may also be provided in powered working machines—suitably at the elbow immediately downstream of the intake opening—in order to obtain an intimate mixture along the further flow path. In this manner it is possible for instance to inject water into a gas to utilize its vaporization heat for cooling the compressor.

BRIEF DESCRIPTION OF THE DRAWINGS

Embodiments of the invention shall now be described with reference to the drawings, in which:

FIG. 1 shows an axial sectional view of a first embodiment of the rotor of a fluid-flow machine according to the invention with centripetal flow, FIG. 2 shows a front view of the rotor shown in FIG. 1, FIG. 8 shows an axial sectional view of a fluid-flow machine according to the invention, having two rotor discs and a guide wheel, FIG. 9 shows a partial front view of the guide wheel shown in FIG. 8, FIG. 10 shows a partial sectional view of the guide wheel shown in FIG. 8, along the line X—X therein.

DETAILED DESCRIPTION

Figure 3:
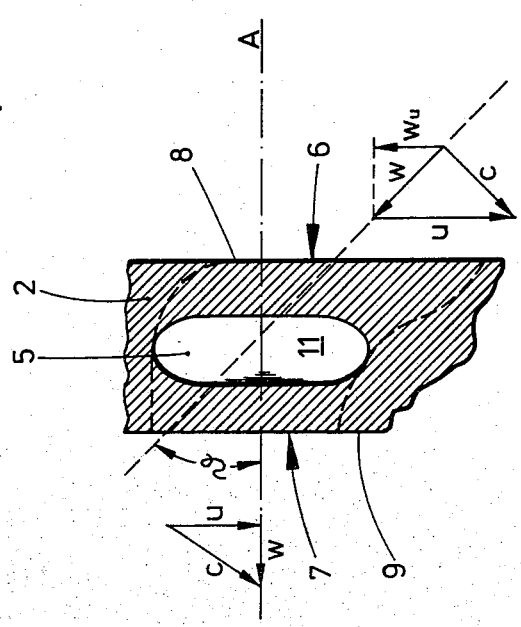
FIG. 3 shows a partial sectional view of the rotor of FIG. 1 along the line III—III.
Figure 4:
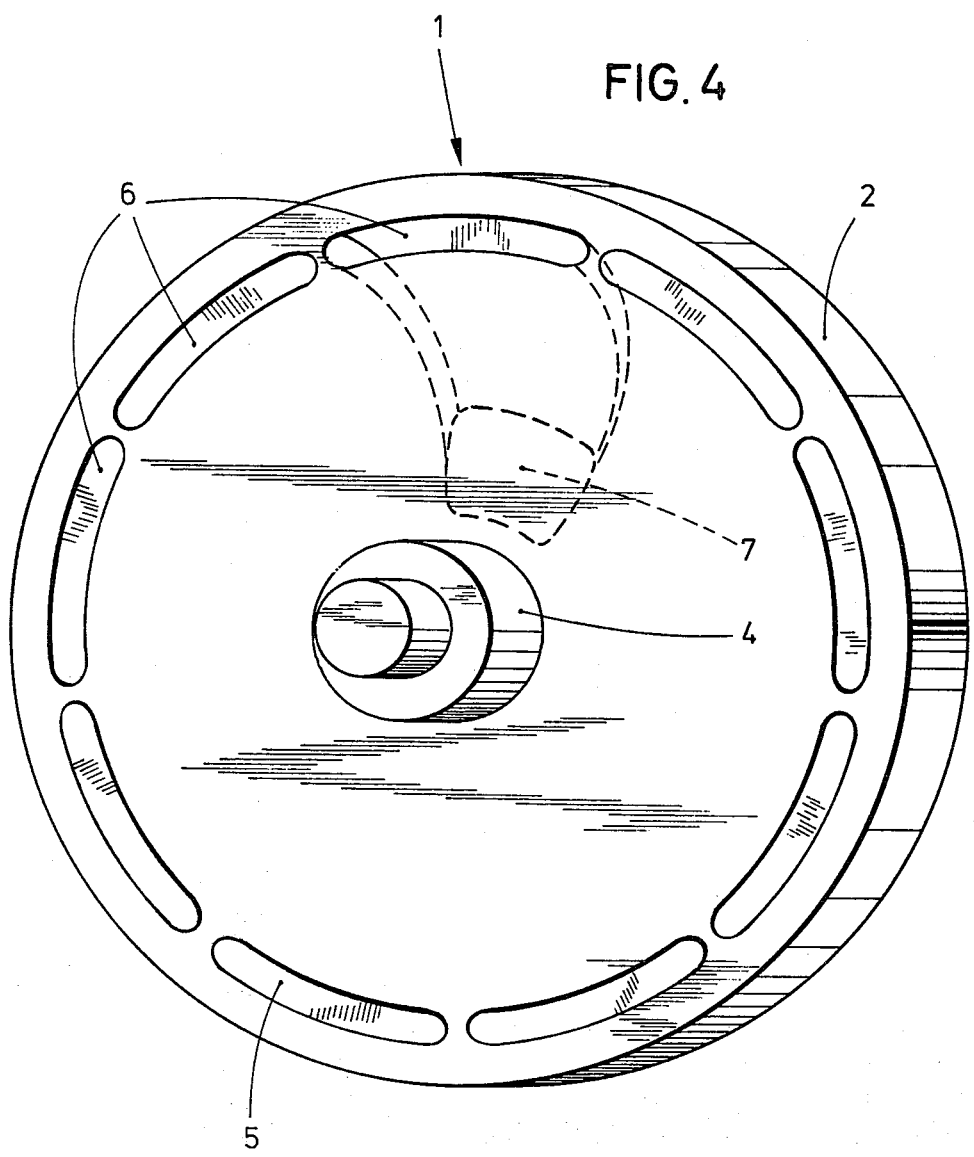
FIG. 4 shows a perspective view of the rotor of FIG. 1.

FIGS. 1 to 4 show a fluid-flow machine 1 according to the invention having a rotor disc 2 in a first embodiment. The rotor 2 is disc-shaped and non-rotatably secured to a shaft 4 as by means of a spline key 3. In the embodiment shown, the rotor has nine flow channels 5 for flowing a flow medium therethrough. Flow channels 5 each have an intake opening 6 and an exit opening 7. As shown in FIGS. 2 and 4, intake openings 6 are formed as slits the corners of which may be rounded. All slits 6 extend along a circular line concentrically surrounding the axis of shaft 4 and having a mean diameter D as shown in FIG. 2.

The radial dimension of exit openings 7 in FIG. 2 is greater than that of intake openings 6, while their circumferential dimension is smaller than that of the latter. This results in an approximately square or circular configuration of the exit openings.

The exit openings are likewise located along a circle concentrically surrounding the axis of shaft 4 and having a mean diameter d as shown in FIG. 2.

In the shown embodiment, d is about one-third of D. This means that the exit openings are located substantially closer to the shaft than the intake openings. As shown particularly in FIG. 1, intake openings 6 are formed in one axial surface 8 of disc-shaped rotor 2, while exit openings 7 are formed in the opposite axial surface 9.

Connection between an intake opening 6 and the corresponding exit opening 7 is provided by the above mentioned flow channel 5 within rotor 2. Flow channel 5 comprises a radially inner elbow 10, an connecting section 11 and a radially outer elbow 12. Inner elbow 10 hat a leg 10a leading directly to exit opening 7. Connecting section 11 functions as a substantially radial-flow connecting channel between a leg 10b of elbow 10 and a leg 12b of elbow 12. The other leg 12a of elbow 12 is directly connected to intake opening 6. The two legs of each elbow extend at an angle of about 90° to one another. The flow channels may retain over their entire length the rectangular sectional shape developed from that of the intake or exit openings, respectively, or they may be circular or oval with a transition leading over to said openings.

FIG. 3 shows a partial sectional view of the rotor of FIG. 1 along the line III—III therein. Shown at the intermediate region of the rotor disc is the connecting section 11 extending substantially radially and having an oval cross-sectional shape in the present case. The further portions of the flow channel are shown in phantom lines. The fluid flow enters the intake opening with the relative velocity w. A corresponding triangle of velocities is drawn adjacent the intake side. The relative velocity w is directed such that the fluid flow may enter the rotor without appreciable losses for further flow along the flow channel. The triangle of velocities further shows the circumferential velocity u, the absolute velocity c and the tangential component $W_u$ of the relative velocity w. Adjacent the exit opening 7 at the exit side it is seen that the fluid flow has been deflected, so that it exits from openings 7 transversely of the plane of the rotor, i.e. in the axial direction of shaft 4. This is also shown in a triangle of velocities. The relative velocity w points in the direction of the axis A of shaft 4.

The circumferential velocity is smaller, since the flow medium leaves the rotor at a point located further radially inwards than its point of entry. Also shown is the absolute velocity c resulting from the relative velocity w and the circumferential velocity u. The tangential component of the relative velocity at the exit side equals zero. It is to be noted that the deflection work during passage through the rotor is relatively small. The axial deflection angle between the entering and the exiting flow amounts to only about 40 degrees. The above discussed embodiment is particularly suited for a power generating machine.

Thanks to this design, the fluid-flow machine 1 according to the invention is able to combine the advantage of small volume flow with the advantage of a low pressure drop per stage. The fluid-flow machine according to the invention is therefore particularly well suited for technological processes, in which accurately defined chemical or physical reactions may be conducted in the transition regions of changes of state. This is because a given pressure drop may be divided into numerous stages.

Due to the low reaction degree in the rotor 2 there occur practically no sealing problems in the solution according to the invention. There is, however, sufficient space available for the inclusion of labyrinth seals and/or end seals between the intake and exit openings on the circumferential surface and/or an the two axial surfaces 7 and 8. In addition, flow losses are reduced by diminishing the deflection angle.

Figure 5:
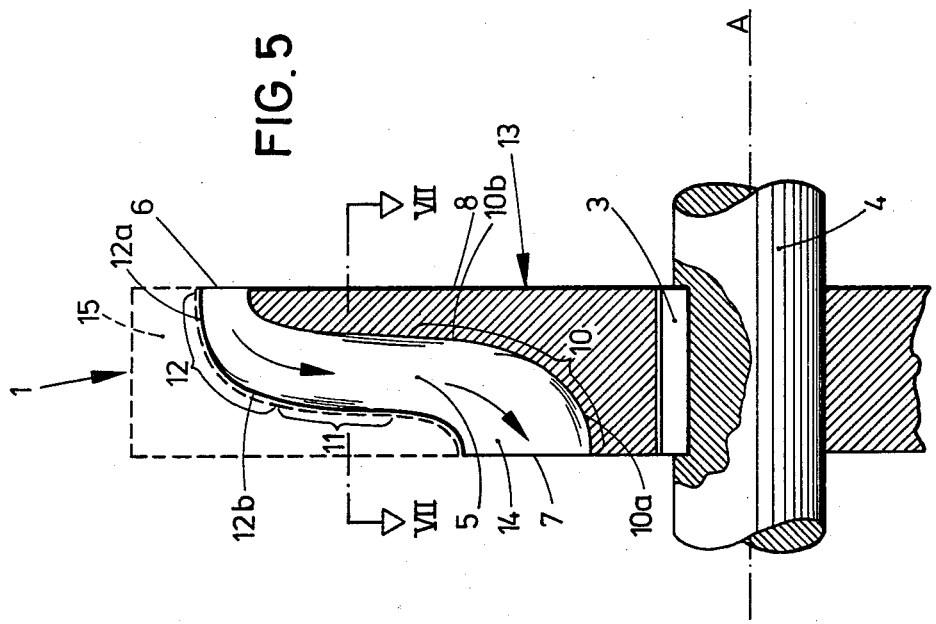
FIG. 5 shows an axial sectional view of a second embodiment of a rotor of the fluid-flow machine according to the invention, the flow channels of which are formed without closure in the outer region.
Figure 7:
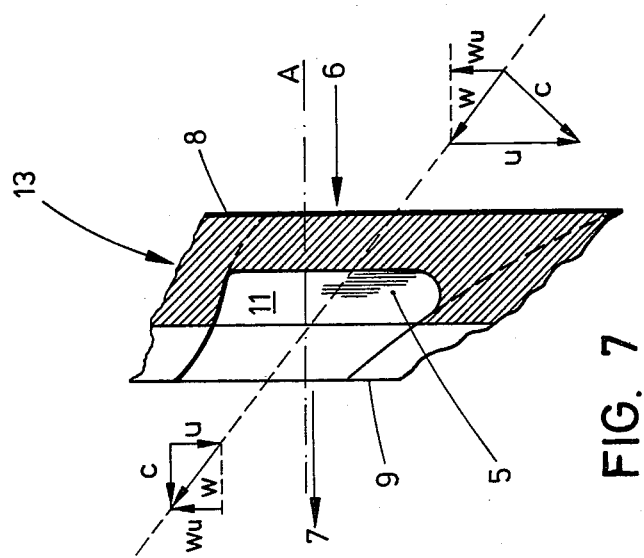
FIG. 7 shows a partial sectional view of the rotor of FIG. 5 along the line VII—VII.
Figure 6:
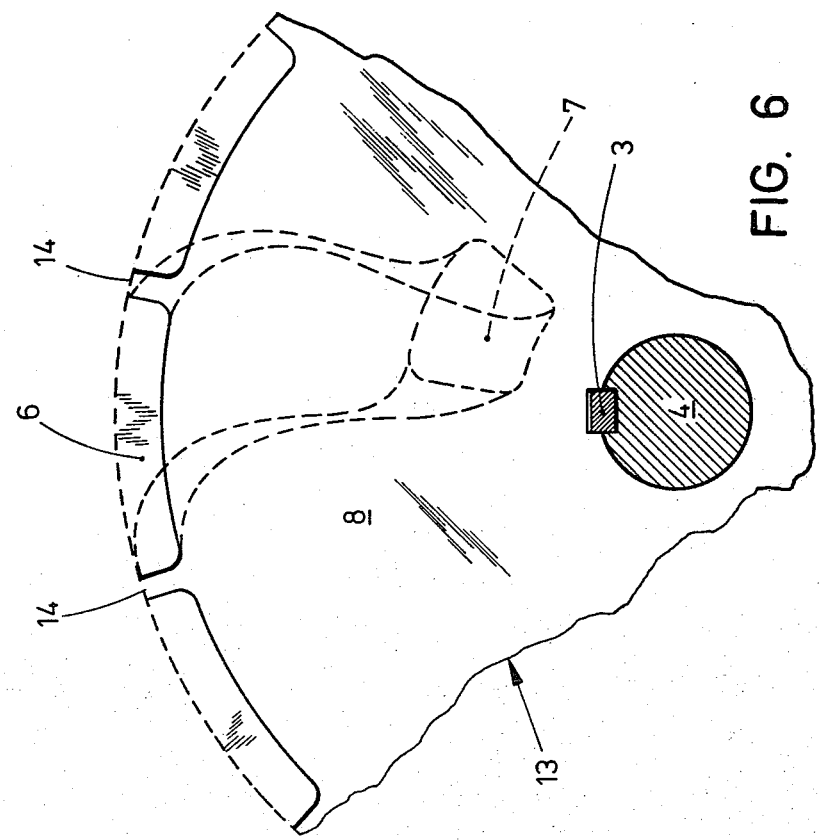
FIG. 6 shows a front view of the rotor of FIG. 5.

FIGS. 5, 6 and 7 show a second embodiment 13 of a rotor for a fluid-flow machine 1 according to the invention. Since the second embodiment differs from the first one only in certain aspects, only these differences shall be discussed in the following, reference being made for the remainder to the description of the first embodiment. Like parts are designated by the same reference numerals.

In the second embodiment there is no radially outer closure or covering of the flow channels. FIG. 5 therefore merely shows a rotor of smaller volume ending in the radial direction at the outer periphery of the flow channels. The partitions 14 extending between adjacent flow channels have free ends. In operation of this fluid-flow machine, a housing 15 shown in phantom lines in FIG. 5 is located closely adjacent the rotor. In view of the low pressure drop occurring in the machine according to the invention, it will in most cases be unnecessary to provide sophisticated seals between the housing 15 and the rotor 13.

FIG. 7 shows a partial sectional view of rotor 13 including one of the flow channels 5 thereof. In this embodiment, the connecting section 11 has substantially the same configuration as that of the first embodiment shown in FIG. 3, with the difference, however, that the flow channel is radially outwardly open.

In contrast to the first embodiment, the fluid-flow undergoes no axial deflection in the second embodiment shown in FIG. 7. As shown by the triangles of velocity drawn at the intake side and at the exit side, the fluid-flow enters the intake openings 6 with the relative velocity w and exits from the flow channel in the same direction with the relative velocity w at the exit openings 7. The axial deflection angle equals zero degrees. The circumferential velocity is of course lower at the exit side due to the point of exit being located on a shorter radius. Since there is no axial deflection in the shown rotor, the flow losses are correspondingly small. While the tangential components of the relative velocities at the intake side and the exit side are of different magnitude, they extend in the same direction.

FIG. 8 shows a portion of a fluid-flow machine 1 comprising a guide wheel 15 located between two rotor discs 2. As shown in this figure, the flow channels formed in the guide wheel are substantially mirror images of the flow channels in the rotor discs. A centripetal flow exists in the flow channels of the rotor discs, while the flow in the guide wheel is centrifugal with respect to shaft 4.

Each of the flow channels 16 in the guide wheel has a radially inner intake opening 17 and a radially outer exit opening 18. All intake openings 17 are formed in one axial surface 19 of the also substantially disc-shaped guide wheel 15, while exit openings 18 are formed in the opposite axial surface 20.

As in rotor discs 2 and 13, each flow channel 16 of guide wheel 15 comprises an elbow 21 connected to intake opening 17 and succeeded by a substantially radial connecting section 22, and a radially outer elbow 23 connected to connecting section 22 and leading to exit opening 18. Both elbows deflect the fluid flow by an angle of about 90° in the radial direction.

FIG. 9 shows a front view of a portion of guide wheel 15. The shown intake opening 17 has substantially the same configuration as the exit opening 7 in the first and second embodiments shown in FIGS. 1 and 5. The exit openings 18 are formed as slots substantially in the same manner as the intake openings 6 in the first two embodiments. All exit openings 18 of the guide wheel are located on a circular line concentrically surrounding the axis A of shaft 4 and having a mean diameter D as in the case of the rotor discs. The same applies to the intake openings 17, the centers of which are substantially located on a circular line with a mean diameter d that is identical with the mean diameter d in FIG. 2. These dimensions ensure a low-friction transition from the rotor disc to the guide wheel and vice versa.

FIG. 10 shows a partial sectional view along the line X—X in FIG. 8. As evident therefrom, there is virtually no axial deflection of the fluid flow within the guide wheel 15 shown.

Figure 11:
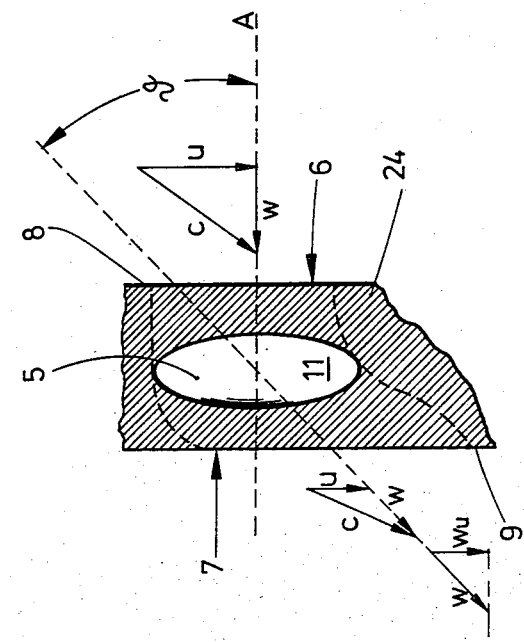
FIG. 11 shows a partial sectional view of a third embodiment of a rotor disc of a fluid-flow machine according to the invention, substantially along a line corresponding to the line III—III in FIG. 1, FIG. 12 a sectional view of an embodiment of a rotor in accordance with FIG. 1, adapted, however, for centrifugal flow.

FIG. 11 shows a third embodiment 24 of a rotor disc of the same basic design as the rotor disc 2 shown in FIGS. 1 to 3. Only the flow channels are oriented such that the fluid flow is deflected in a different manner. Corresponding parts are therefore designated with the same reference numerals as in the first embodiment.

In the case of rotor disc 24, the fluid flow enters the intake openings 6 in the direction of the axis A of shaft 4. The relative velocity w is thus directed parallel to axis A, i.e. there is no tangential component. In contrast thereto, the relative velocity does not extend in the axial direction adjacent the exit openings 7 formed in the exit side. Its direction has been changed by the axial deflection angle having a magnitude of about 45°. The tangential component $W_u$ of the relative velocity is separately shown. This rotor disc 24 is an example of an embodiment in which the fluid flow enters the intake openings in the axial direction and is then deflected axially by a relatively small angle.

Figure 12:
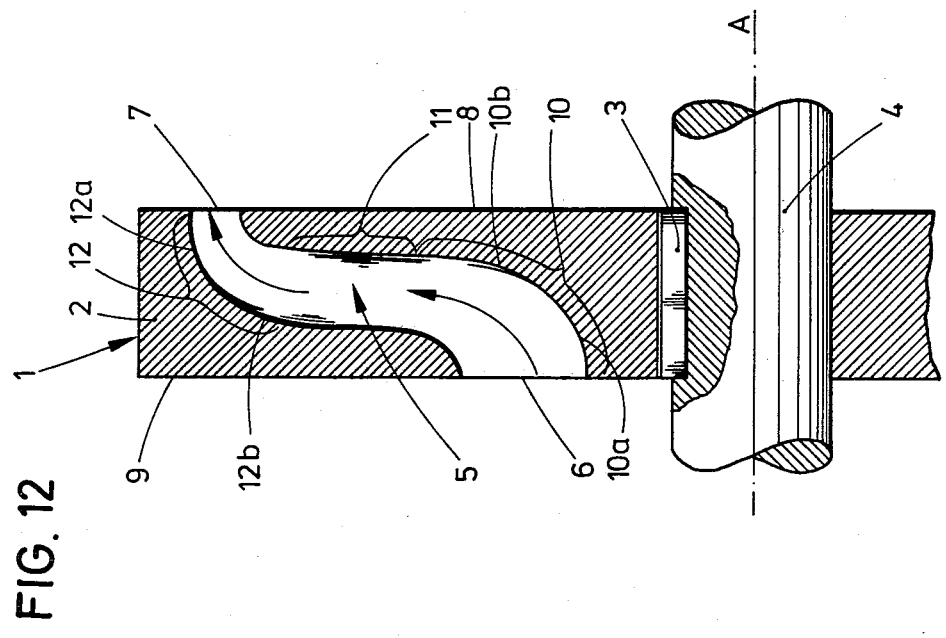

FIG. 12 shows a rotor disc 8 the configuration of which substantially corresponds to that of the rotor in FIG. 1. In this embodiment, however, the intake openings 6 are located more closely to the axis of rotation A than the exit openings 7. This results in a centrifugal flow within the flow channels. This embodiment is equally well suited for power generating machines as well as for powered working machines.

In the case of centrifugal flow within the flow channels, the intake and exit openings may also be designed such that the developing flow patterns are analogous to those shown in FIGS. 3, 7, and 11.

Figure 13:
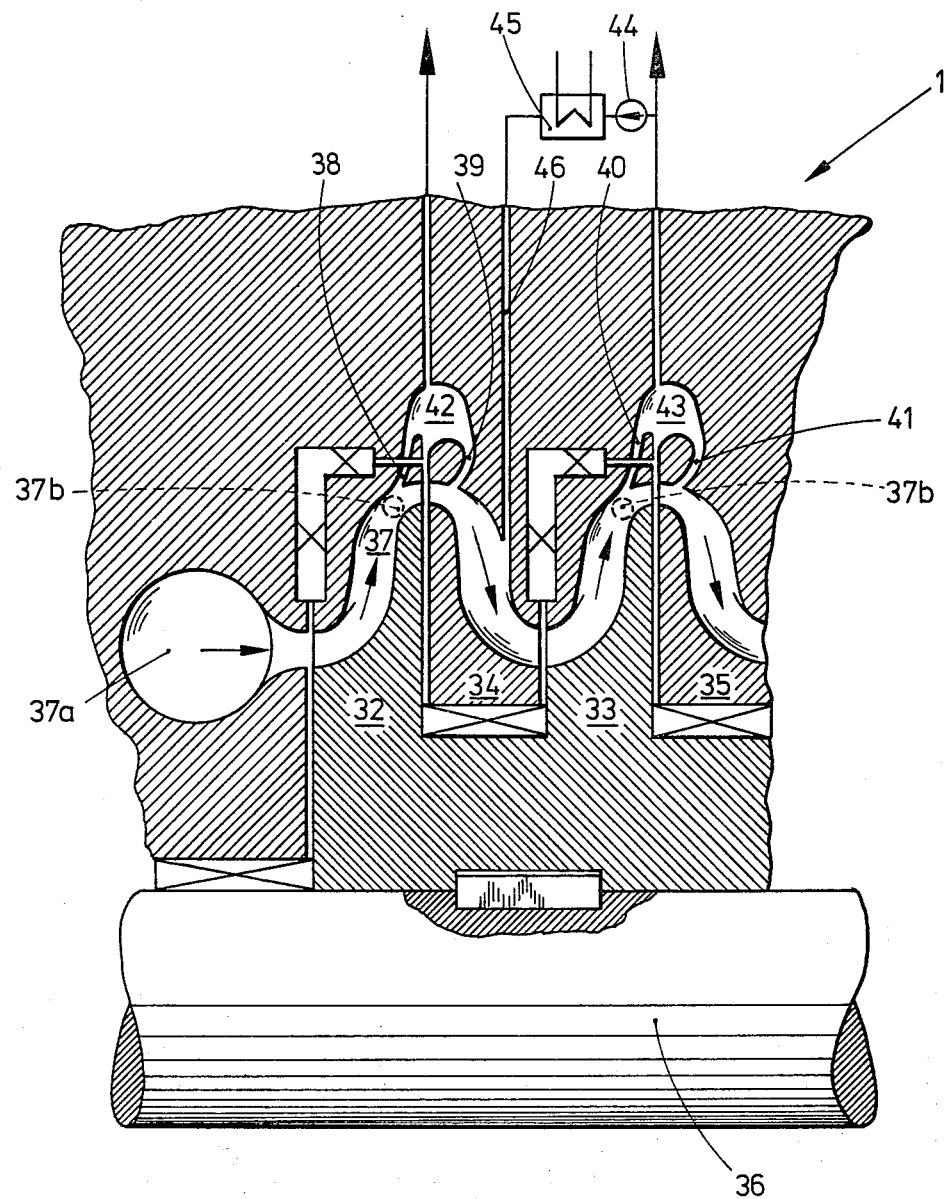
FIG. 13 shows an axial sectional view of a fluid-flow machine according to the invention in an embodiment as a centrifugal gas turbine for hydrogen expansion.

FIG. 13 shows an embodiment of a fluid-flow machine 1, comprising two rotor discs 32, 33 having flow channels corresponding for instance to those shown in FIGS. 1 to 3 for centrifugal flow therethrough. The shown fluid-flow machine 1 is a two-stage design including two guide wheels 34 and 35, the flow channels of which are substantially shaped as mirror-images of those in the rotor discs.

The shown fluid-flow machine may be employed as a centrifugal gas turbine for hydrogen expansion with centrifugal flow in the rotor discs. Rotor discs 32 and 33 are rotatably supported on a shaft 36. A fluid, e.g. hydrogen, is fed to an intake opening of a flow channel 37 in rotor disc 32 via a manifold 37a. Within the rotor disc 32, the centrifugal flow is deflected by an elbow of the flow channel towards an exit opening formed in the axial surface of the rotor disc, from where it enters guide wheel 34. Within the guide wheel 34 the flow path is centripetal. Prior to its entry into the second stage, i.e. into second rotor disc 33, the fluid flow is again deflected in a corresponding elbow. In second rotor disc 33, the flow direction is again centrifugal, and in the following guide wheel, centripetal.

Formed at the outer peripheries of the radially outer elbows of each flow channel in the rotor discs and guide wheels are additional openings or ports 38, 39, 40, and 41 serving to divert a portion of the flow medium from the respective flow channels to the outside.

In the present case these ports are used for withdrawing components of the gaseous mixture condensing in the course of phase transition with the aid of centrifugal forces. This is because the centrifugal flow results in the formation of a flow vortex 37b shown in phantom lines in FIG. 13 adjacent the radially outer elbow of each flow channel, said vortices promoting the concentration of liquid particles condensed in the course of phase transition and the exit thereof through openings 38 and 40. Residual amounts of such liquid particles are carried over to the adjacent guide wheels from where they may be withdrawn via ports 39 and 41 formed therein. Ports 38 and 39 and ports 40 and 41 are connected to common collector channels 42 and 43, respectively.

The separation process may be combined with a mechanical fractioned distillation to increase the degree of purity of the product. To this effect, the major portion of the collected liquid is recirculated to a preceding stage, as shown at the second stage with rotor disc 33 and guide wheel 35. As in the case of the recirculation of the bottom product of a distillation column, the pressure of the recirculated product is initially increased by means of a recirculation pump 44, whereupon the liquid is revaporized by supplying external heat to an evaporator 45. The resulting vapor is recirculated into the system via a return duct 46 opening tangentially and in centripetal direction into the flow channel of guide wheel 34. This recirculation results not only in an increase of the output of the machine, but also in an increase of the concentration of the flow medium and thus of the degree of purity of the product. This permits substantial savings in the succeeding distillation plant. A centrifugal gas turbine of the type shown may also be designed in the manner of conventional radial power generating machines with centripetal flow in the rotor discs, in which case the separation process takes place mainly in the guide wheels, although without the aid of centrifugal forces.

In an analogous manner, a second flow medium or working medium may be introduced into a powered working machine via the described ports, in which case the described vortices aid not only in introducing such second medium into the flow channels, but also in the mixing thereof with the first working medium.

The embodiments of the invention in which an exclusive property or privilege is claimed are defined as follows:

1. In a fluid-flow machine having at least one substantially disk-shaped rotor including flow channels for a flow medium, the intake openings of which are disposed in one axial surface of said rotor while the associated exit openings are disposed in the other axial surface, all intake openings being located at a predetermined distance from the axis of rotation, said distance being different from the distance of the respective exit openings from said axis of rotation, each flow channel having a radially outer and a radially inner deflector elbow, each said elbow having two legs forming an angle of approximately 90 degrees, one leg of the radially outer, or inner, respectively, elbow leading towards the intake opening and extending in the direction of the relative velocity of the intake flow of the flow medium prevailing thereat, and one leg of the radially inner, or outer, respectively, elbow leading towards said exit opening and extending in the direction of the relative velocity of the exit flow, the other legs of said elbows being directed towards a substantially radial common connecting section connecting the two elbows with one another, the improvement comprising wherein the leg openings through said one axial surface and the leg openings through said other axial surface are directed such that the relative velocities (w) at said one axial surface openings have a tangential component (Wu) of magnitude greater than zero and at the other axial surface openings have a tangential component (Wu) in the same direction as said tangential component (Wu) at said one axial surface openings and of magnitude greater than or equal to zero.

2. A fluid flow machine according to claim 1, wherein the leg of one of said elbows leading towards the intake opening and the leg of the other elbow leading towards said exit opening are directed such that said tangential component (Wu) is completely absent at one of the set of intake openings and the set of exit openings.

3. A fluid flow machine according to claim 1, in which said relative velocity tangential component (Wu) is completely absent at said set of exit openings.

4. A fluid flow machine according to claim 1, wherein the leg of one of said elbows leading towards the intake opening and the leg of the other elbow leading towards said exit opening are directed such that the tangential components (Wu) of the relative velocities (w) at the intake and exit openings are unidirectional.

5. A fluid-flow machine according to claim 1, wherein the flow channels are formed without radial closure at least in the outer region of the rotor.

6. A fluid-flow machine according to claim 1, wherein said flow channels include at least one opening defining a branch channel adjacent one end of said flow channel and enabling a portion of said flow medium to travel in said branch channel rather than in the adjacent end of said flow channel.

7. In a fluid-flow machine having at least one substantially disk-shaped rotor including flow channels for a flow medium, the intake openings of which are disposed in a set in one axial surface of said rotor while the associated exit openings are disposed in a set in the other axial surface, all intake openings being located at a predetermined distance from the axis of rotation, said distance being different from the distance of the respective exit openings from said axis of rotation, each flow channel having a radially outer and a radially inner deflector elbow, each said elbow having two legs forming an angle of approximately 90 degrees, one leg of the radially outer, or inner, respectively, elbow leading towards the intake opening and extending in the direction of the relative velocity of the intake flow of the flow medium prevailing thereat, and one leg of the radially inner, or outer, respectively, elbow leading towards said exit opening and extending in the direction of the relative velocity of the exit flow, the other legs of said elbows being directed towards a substantially radial common connecting section connecting the two elbows with one another, the improvement comprising wherein the leg of one of said elbows leading towards the intake opening and the leg of the other elbow leading towards said exit opening are directed such that the tangential components ($W_u$) of the relative velocities (w) are completely absent at one of said set of intake openings and said set of exit openings.

8. A fluid-flow machine according to claim 7, in which said intake openings are directed to have a relative velocity tangential component ($W_u$) and said exit openings are directed so that relative velocity tangential components ($W_u$) are absent.

* * * * *